United States Patent [19]

Szpakowski

[11] 4,161,773
[45] Jul. 17, 1979

[54] PUSH-PULL INVERTER INCLUDING STARTER CIRCUIT

[75] Inventor: Bronislaw T. Szpakowski, Kanata, Canada

[73] Assignee: Northern Telecom Limited, Montreal, Canada

[21] Appl. No.: 922,973

[22] Filed: Jul. 10, 1978

[51] Int. Cl.² .................................... H02M 7/515
[52] U.S. Cl. ........................................ 363/49; 363/139
[58] Field of Search ................... 363/27, 28, 49, 133, 363/134, 135, 139

[56] References Cited

U.S. PATENT DOCUMENTS 3,333,179  7/1967  Freeman ............................ 363/49
3,579,077  5/1971  Cameron ........................... 363/49

FOREIGN PATENT DOCUMENTS 18974  10/1963  Japan .................................. 363/49

Primary Examiner—William M. Shoop
Attorney, Agent, or Firm—Robert C. Hogeboom

[57] ABSTRACT

In a push-pull inverter (including a transformer) for changing direct current into alternating current, a circuit is disclosed for starting the inverter in which the first pulse of a rectangular pulse train applied to the transformer has a duration of one half that of the subsequent pulses. This aids in reducing the initial magnitude of the flux excursion in the transformer core.

10 Claims, 3 Drawing Figures

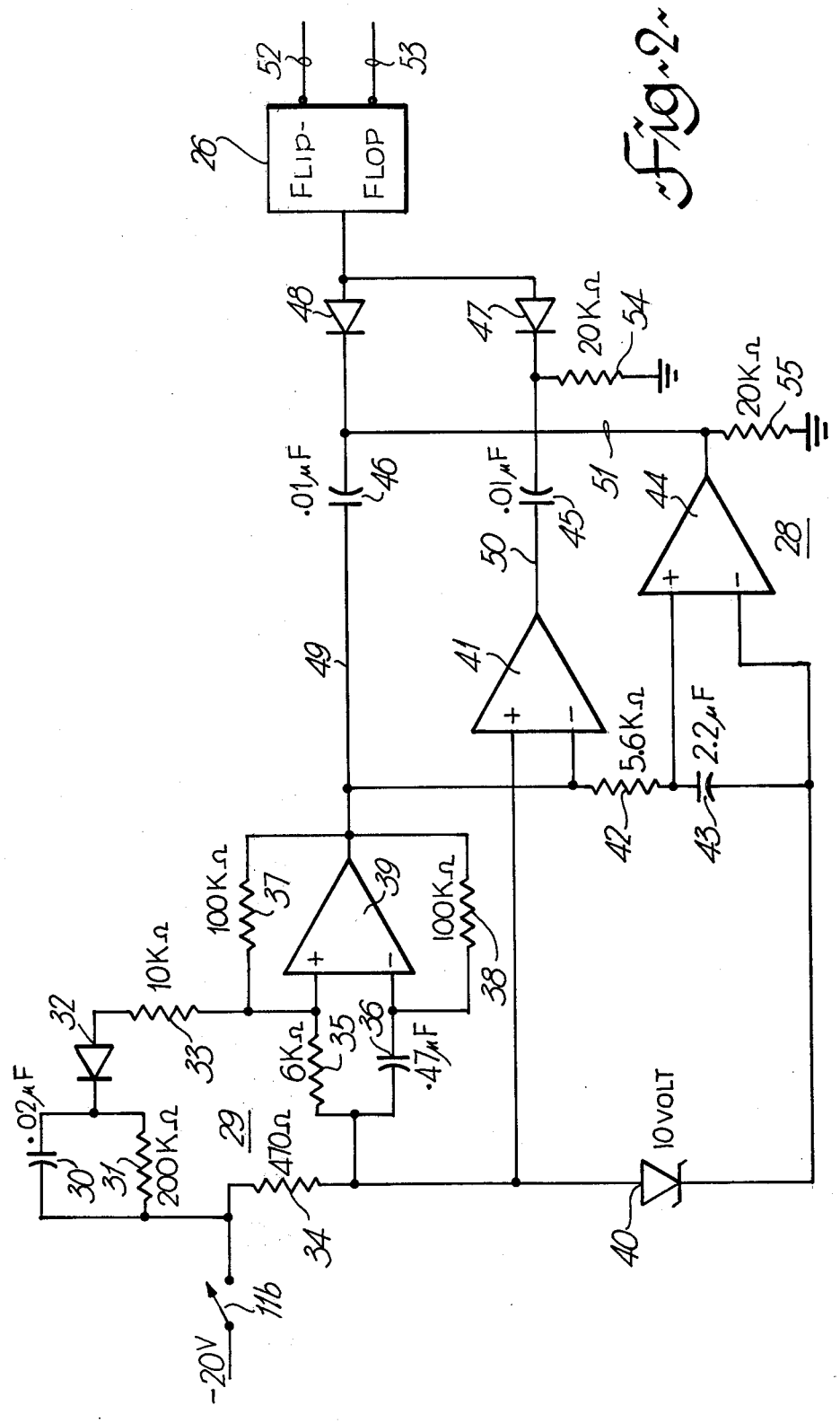

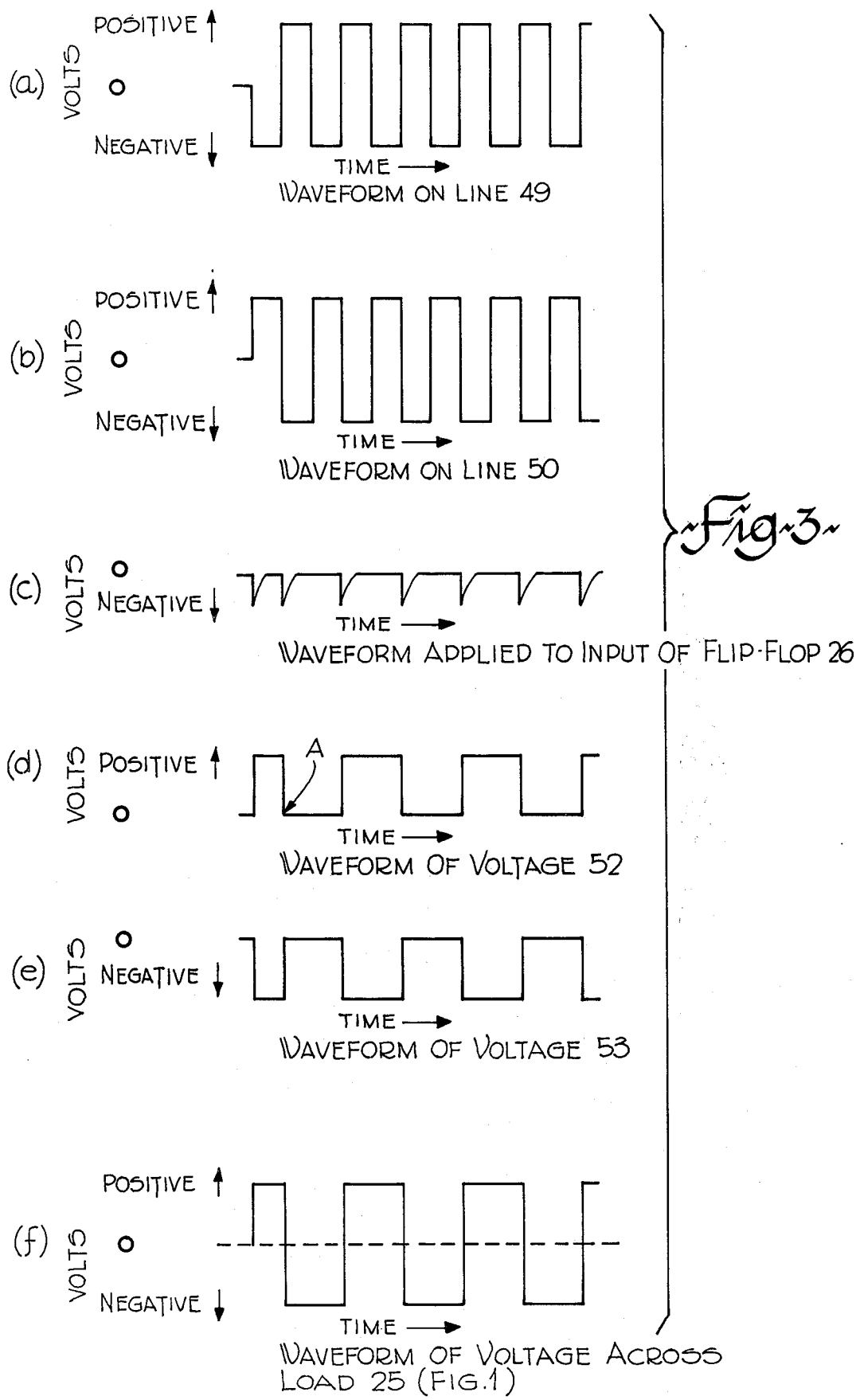

PUSH-PULL INVERTER INCLUDING STARTER CIRCUIT

This invention relates generally to inverter circuits and more particularly to a circuit for reducing the flux and the current inrush during start-up of an inverter.

An inverter typically comprises a source of DC power (e.g. a battery), a circuit to produce alternating positive and negative pulses from the DC power source, a transformer having a primary winding responsive to the positive and negative pulses, and a secondary winding to which an AC (alternating current) load is connected. Starting an inverter presents some difficulties due to the initial assymmetrical flux excursion in the transformer core. This initial assymmetry normally disappears after a few cycles due to the impedance of the circuitry (including the leakage inductance of the transformer). The magnitude of the initial magnetic flux density in the transformer core may reach a value double that of the maximum flux density under normal steady state operating conditions.

A transformer designed to handle only the magnitude of the steady state magnetic flux can go into saturation, during start-up of the inverter, thereby causing an inrush current limited only by the impedance of the circuit connected to the primary winding of the transformer and the impedance of the transformer at saturation. Inrush starting current presents problems for inverter circuits. In the case of an SCR push-pull inverter, if starting current exceeds the capacitor commutating capability, the inverter goes to undesirable short circuit conditions.

In the prior art, the problem of excessive flux density during start-up of an inverter has been solved by using over-designed (for steady-state operation) transformers which increase the cost, or by using high impedances in the circuit. Special starting and operating circuits are also used such as the ones depicted in U.S. Pat. No. 4,047,089 dated Sept. 6, 1977 to T. Suzuki, T. Yoshida, and S. Wachi; U.S. Pat. No. 4,051,425 dated Sept. 27, 1977 to J. L. Smith; U.S. Pat. No. 4,044,295 dated Aug. 23, 1977 to F. A. Ferraiolo and R. K. Griess; and U.S. Pat. No. 3,391,325 dated July 2, 1968 to R. Giannamore.

The present invention alleviates the problem of excessive magnetic flux density during the initial energization of the transformer by ensuring that the first voltage pulse applied to the transformer is applied for only one half the duration of subsequent pulses.

Stated in other terms, the present invention is an inverter for transforming direct current from a source of direct current into alternating current, the inverter including a transformer having a first winding for receiving a train of rectangular pulses from a switching means whereby the switching means selectively interrupts a flow of current from the source of direct current to the first winding, the transformer having a second winding for connection to an AC load, the inverter characterized by a control circuit means for controlling the operation of the switching means such that, upon start-up of the inverter, the first pulse applied to the first winding has one half the duration of the subsequent pulses in the train of rectangular pulses, and the subsequent pulses in the train, after the first pulse, are all of the same duration.

Stated yet in other terms, the present invention is an inverter for transforming direct current from a source of direct current into alternating current, the inverter having a pair of terminals for connection to the source of direct current, switching means for selectively interrupting the current flow from the source of direct current and thereby providing a train of rectangular pulses, a transformer having a first winding for receiving the train of pulses and a second winding for connection to an AC load, the inverter characterized by: control circuit means for controlling the operation of the switching means, the control circuit means including, an oscillator for providing a rectangular wave output, an inversion circuit responsive to the output from the oscillator for producing an inversion of the output from the oscillator, a flip-flop circuit responsive to the output signals from both the oscillator and the inversion circuit, wherein the switching means is responsive to the output of the flip-flop, and a circuit for preventing the output of the oscillator from reaching the flip-flop after an initial delay period long enough to allow only the first pulse from the oscillator to reach the flip-flop, such that the flip-flop becomes responsive only to the pulses from the inversion circuit.

In still other terms, in an inverter for transforming direct current from a source of direct current into alternating current, the inverter including a transformer having a first winding for receiving rectangular pulses from a switching means whereby the switching means selectively interrupts a flow of current to the first winding from the source of direct current, the transformer having a second winding for connection to an AC load, the method comprising: operating the switching means such that the switching means produces rectangular pulses characterized by having the first pulse one half the duration of subsequent pulses.

One preferred embodiment of the invention will now be described with reference to the accompanying drawings wherein:

FIG. 2 is a simplified schematic diagram, in more detail, of a portion of FIG. 1; and FIG. 3 consists of parts a, b, c, d, e and f, depicting several waveforms helpful in understanding the circuits of FIGS. 1 and 2.

Figure 1:
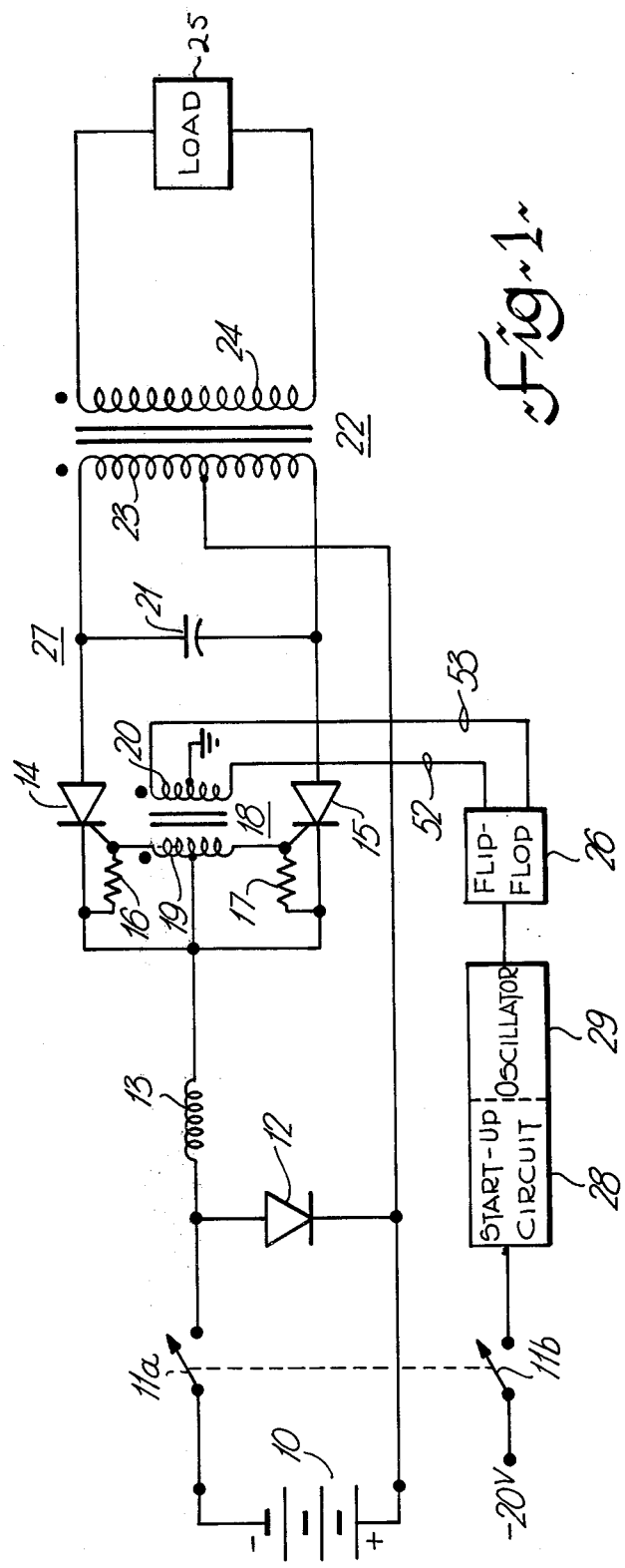
FIG. 1 is a simplified block-schematic diagram, of one embodiment of the present invention.

The interconnection of the various components are shown in FIG. 1 and attention is directed to that Figure. The operation of FIG. 1 will now be described briefly. Battery 10 supplies power to the circuitry via switch 11a. Inductor 13 is the commutating inductor and capacitor 21 is the commutating capacitor for the inverter circuit 27. Diode 12 is employed to suppress transients when switch 11a is opened.

Silicon Controlled Rectifiers (SCRs) 14 and 15 control the current flow to primary winding 23 of the transformer 22, as is well known in the inverter art. Resistors 16 and 17 are biasing resistors for SCRs 14 and 15 respectively. Transformer 18, with a centre tapped secondary winding 19 and a centre tapped primary winding 20, carries control signals to the SCRs 14 and 15 from flip-flop 26 as is well known. When voltage 52 from flip-flop 26 is positive, SCR 15 is turned on; when voltage 53 from flip-flop 26 is positive, SCR 14 is turned on. Only one of SCRs 14 and 15 are on at any given time. In the exemplary embodiment depicted, voltage 52 (see FIG. 3d) goes positive upon start-up, therefore SCR 15 conducts first (and SCR 14 is off); subsequently SCR 14 turns on (in response to the positive portions of voltage 53, see FIG. 3e) and SCR 15 turns off. As a result, SCR 14 turns on and off at a constant and regular rate, with a duty cycle of 50%, while SCR 15 turns on initially for a shorter time period, then after its first turned on period it follows the same cycle as SCR 14, but 180 degrees out of phase therewith.

Flip-flop 26 is responsive to oscillator 29, which is in turn responsive to start-up circuit 28. The operation of start-up circuit 28 is initiated by switch 11b which operates in unison with switch 11a. Transformer 22, with a centre-tapped primary winding 23 and a secondary winding 24, couples the output voltage of inverter 27 to load 25.

FIG. 2 depicts start up circuit 28 and oscillator 29 in more detail, and will now be described. The interconnection of the various components is shown in FIG. 2 and attention is directed to it.

Operational amplifier 39, with feedback resistors 37 and 38 and with resistor 35 connected to the non-inverting (+) input and capacitor 36 connected to the inverting (−) input, functions as an oscillator with an approximately square wave output on line 49 having a frequency of approximately 120 Hz. Resitor 33, diode 32, and the parallel combination of capacitor 30 and resistor 31 are employed to ensure that upon starting up, operational amplifier 39 produces a negative going pulse as its first output. After operational amplifier 39 has started operation, resistor 33, diode 32, capacitor 30, and resistor 31 no longer play an active part in the operation of operational amplifier 39. The output of operational amplifier 39, on line 49, is applied to the series combination of capacitor 46 and diode 48; this series combination of capacitor 46 and diode 48 functions as a pulse shaper, and diode 48 additionally functions so that only negative going pulses, from operational amplifier 39 are applied to flip-flop 26.

Operational amplifier 41 has its inverting (−) input responsive to the output of operational amplifier 39. Consequently, the output of operational amplifier 41, on line 50, is identical to the signal on line 49 but opposite in polarity. Amplifier 41 and its associated circuitry function as an inversion circuit. The series combination of capacitor 45 and diode 47 functions as a pulse shaper, and diode 47 additionally functions so that only negative going pulses, from operational amplifier 41 are applied to flip-flop 26.

Operational amplifier 44 produces at its output, after a time delay determined by resistor 42 and capacitor 43, a constant positive voltage 51. Voltage 51 keeps diode 48 reverse biased and therefore non-conducting. The time delay determined by resistor 42 and capacitor 43 is such that diode 48 is able to pass the first negative going pulse produced by operational amplifier 39 before voltage 51 reaches a sufficient level to reverse biase diode 48 and thereby block additional pulses from operational amplifier 39.

Flip-flop 26 is responsive to the negative going pulses coming from diodes 47 and 48. Every pulse applied to flip-flop 26 causes the output voltages 52 and 53 of flip-flop 26 to change state thereby producing a rectangular waveform.

FIG. 3 depicts some of the waveforms produced by the circuit of FIG. 2. FIG. 3a depicts the waveform of the voltage on line 49; this is a rectangular waveform, with a fifty percent duty cycle, having a frequency of 120 Hz. It can be seen from FIG. 3b that the voltage on line 50 has the same waveform as the voltage on line 49 but is 180 degrees out of phase therewith.

FIG. 3c depicts the voltage pulses applied to the input of flip-flop 26. The first time that the voltage on line 49 goes negative, a negative pulse is applied to the input of flip-flop 26. After this first negative excursion of the voltage on line 49 the voltage on line 49 does not directly affect the pulses applied to flip-flop 26. The first time the voltage on line 50 goes negative, and every subsequent time that the voltage on line 50 goes negative, a negative pulse is applied to the input of flip-flop 26. This results in two relatively closely spaced pulses at the left side of FIG. 3c, followed by a train of evenly spaced pulses. The first pulse on the left of FIG. 3c is produced by operational amplifier 39 (FIG. 2) and the second and subsequent pulses in FIG. 3c are produced by operational amplifier 41 (FIG. 2).

FIGS. 3d and 3e depict the waveforms of the voltages 52 and 53 respectively, as produced by flip-flop 26. As is well known in the art, every time a negative pulse is applied to the input of flip-flop 26, the outputs (i.e. voltages 52 and 53) of the flip-flop 26 change state.

In FIG. 3d the voltage 52 is initially zero volts. When the first negative pulse is applied to the input of the flip-flop 26 (see FIG. 3c) voltage 52 goes positive; when the second negative pulse is applied to the input of flip-flop 26 voltage 52 goes back to zero volts; when the third negative pulse is applied to the input of flip-flop 26 voltage 52 goes positive once more, etc. The resultant output of flip-flop 26 (as seen in FIG. 3d) can be thought of as a train of rectangular pulses, with the first pulse (ending at point A) having a duration one half that of the subsequent pulses in the train. FIG. 3f depicts the waveform of the voltage across load 25 (FIG. 1), with a frequency of 60 Hz.

The operation of the invention can be summarized as follows. Operational amplifier 39 is connected as an oscillator and produces a rectangular wave output. The first oscillation of amplifier 39, output on line 49, is negative going and is applied to flip-flop 26 via capacitor 46 and diode 48, thereby causing flip-flop 26 to change its state for the first time (since start up). Operational amplifier 41 inverts the output from amplifier 39 and applies its output via line 50, capacitor 45 and diode 47 to the input of flip-flop 26. Operational amplifier 44 produces a steady-state positive voltage (after a suitable delay provided by capacitor 43 and resistor 42) and applies this positive voltage to the anode of diode 48 in order to reverse bias diode 48 and thereby prevent diode 48 from conducting the pulses on line 49 to flip-flop 26 (after the first pulse from operational amplifier 39 has been passed by diode 48). Subsequent negative pulses reaching the input of the flip-flop 26 are provided by operational amplifier 41 via capacitor 45 and diode 47. The remainder of the circuit (see FIG. 1) functions in a conventional manner for an inverter. The result of having the shorter initial pulse in voltage 52 (see FIG. 3d) is that when transformer 22 is started, it is energized at one polarity for a shorter time period and consequently less flux is produced than if the voltage had been applied for the full duration of a standard pulse. This allows the flux oscillations in the transformer to reach their steady-state operating conditions more quickly than if the full period voltage pulse were applied.

What is claimed is:

1. An inverter for transforming direct current from a source of direct current into alternating current, said inverter including a transformer having a first winding for receiving a train of rectangular pulses from a switching means whereby said switching means selectively interrupts a flow of current from said source of direct current to said first winding, said transformer having a second winding for connection to an AC load, said inverter characterized by a control circuit means for controlling the operation of said switching means such that, upon start-up of said inverter, the first pulse applied to said first winding has one half the duration of the subsequent pulses in said train of rectangular pulses, and the subsequent pulses in said train, after said first pulse, are all of the same duration.

2. The inverter of claim 1 wherein said train of rectangular pulses, excluding said first pulse, has a duty cycle of 50 percent.

3. The inverter of claim 1 or 2 wherein said first winding has a centre tap for connection to the second terminal of said source of direct current and said switching means comprises a first controllable switching device for connection intermediate the first terminal of said source of direct current and the first end of said first winding, and a second controllable switching device for connection intermediate the first terminal of said source of direct current and the second end of said first winding, such that said first switching device produces a first train of pulses in a first portion of said first winding, and said second switching device produces a second train of pulses in a second portion of said first winding.

4. An inverter for transforming direct current from a source of direct current into alternating current, said inverter having a pair of terminals for connection to said source of direct current, switching means for selectively interrupting the current flow from said source of direct current and thereby providing a train of rectangular pulses, a transformer having a first winding for receiving said train of pulses and a second winding for connection to an AC load, said inverter characterized by:
control circuit means for controlling the operation of said switching means, said control circuit means including,
an oscillator for providing a rectangular wave output,
an inversion circuit responsive to the output from said oscillator for producing an inversion of the output from said oscillator,
a flip-flop circuit responsive to the output signals from both said oscillator and said inversion circuit, wherein said switching means is responsive to the output of said flip-flop, and
a circuit for preventing the output of said oscillator from reaching said flip-flop after an initial delay period long enough to allow only the first pulse from said oscillator to reach said flip-flop, such that said flip-flop becomes responsive only to the pulses from said inversion circuit.

5. The inverter circuit of claim 4 wherein said train of rectangular pulses, excluding said first pulse, has a duty cycle of 50 percent.

6. The inverter of claim 4 or 5 wherein the frequency of said rectangular pulse train, after said first pulse, is 60 Hz.

7. An inverter for transforming direct current from a source of direct current having first and second terminals into alternating current, said inverter including a transformer having a first winding with a centre tap for receiving rectangular pulses from a switching means whereby said switching means comprises a first controllable switching device connected intermediate the first terminal of said source of direct current and the first end of said first winding, and a second controllable switching device connected intermediate the first terminal of said source of direct current and the second end of said first winding, and the centre tap of said first winding being connected to the second terminal of said source of direct current, said transformer having a second winding for connection to an AC load, said inverter characterized by:
a control circuit means for controlling the operation of said switching means such that, upon start-up of said inverter, the first pulse applied to said first winding has one half the duration of the subsequent pulses applied to said first winding, and the subsequent pulses, after said first pulse, are all of the same duration.

8. The inverter of claim 7 wherein said first controllable switching device turns on initially for one half the length of time of its subsequent turn-on periods, and said second switching device turns on initially, and subsequently, for the same length of time as does said first switching device after its initial turn-on period.

9. The inverter of claim 8 wherein the duty cycle of said first and second switching devices, after the first turn-on period, is 50 percent.

10. In an inverter for transforming direct current from a source of direct current into alternating current, said inverter including a transformer having a first winding for receiving rectangular pulses from a switching means whereby said switching means selectively interrupts a flow of current to said first winding from said source of direct current, said transformer having a second winding for connection to an AC load, the method comprising:
operating said switching means such that said switching means produces rectangular pulses characterized by having the first pulse one half the duration of subsequent pulses.

* * * * *